(12) United States Patent
Feng

(10) Patent No.: US 11,943,286 B2
(45) Date of Patent: Mar. 26, 2024

(54) APPLICATION INSTANCE SWITCHING METHOD AND APPARATUS

(71) Applicant: HUAWEI TECHNOLOGIES CO., LTD., Shenzhen (CN)

(72) Inventor: Jiangping Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/147,166

(22) Filed: Dec. 28, 2022

(65) Prior Publication Data

US 2023/0134708 A1    May 4, 2023

Related U.S. Application Data

(63) Continuation of application No. PCT/CN2021/088136, filed on Apr. 19, 2021.

(30) Foreign Application Priority Data

Jun. 29, 2020   (CN) .......................... 202010603843.6

(51) Int. Cl.
*G06F 15/16*   (2006.01)
*H04L 67/1014*  (2022.01)
*H04L 67/1029*  (2022.01)

(52) U.S. Cl.
CPC ...... *H04L 67/1014* (2013.01); *H04L 67/1029* (2013.01)

(58) Field of Classification Search
CPC .......................... H04L 67/1014; H04L 67/1029
USPC ........................................................... 709/203
See application file for complete search history.

(56) References Cited

U.S. PATENT DOCUMENTS

| | | | |
|---|---|---|---|
| 6,891,842 B2 * | 5/2005 | Sahaya ................. | H04W 88/16 370/469 |
| 6,909,899 B2 * | 6/2005 | Wang ..................... | H04L 69/14 455/432.1 |
| 10,419,983 B2 * | 9/2019 | Zhu ....................... | H04W 36/18 |
| 10,433,153 B2 * | 10/2019 | Uchiyama .......... | H04W 68/005 |
| 10,440,096 B2 * | 10/2019 | Sabella .................. | H04L 67/10 |
| 10,455,640 B2 * | 10/2019 | Nolan ................... | H04W 88/04 |
| 10,574,833 B2 * | 2/2020 | Rasanen ............... | H04M 15/00 |
| 10,797,955 B2 * | 10/2020 | Lessmann ........... | H04L 41/0894 |
| 10,873,886 B2 * | 12/2020 | Shi ....................... | H04L 12/28 |
| 11,144,340 B2 * | 10/2021 | Warnicke ............. | H04L 67/563 |

(Continued)

*Primary Examiner* — Alicia Baturay
(74) *Attorney, Agent, or Firm* — Maier & Maier, PLLC

(57) ABSTRACT

A communication method and a communication apparatus that can be used for application instance switching in a multi-access edge computing (MEC) scenario. The method includes: an MEC network element obtains information about a source application instance of an application accessed by a terminal device and information about a target application instance of the application. The MEC network element sends a first message to a first MEC platform, where the first message is used to request to migrate a user context of the application from the source application instance to the target application instance, the source application instance is deployed on the first MEC platform, and the target application instance is deployed on a second MEC platform. The MEC network element receives a second message from the first MEC platform, where the second message indicates a migration state of the user context of the application.

16 Claims, 7 Drawing Sheets

(56) References Cited

U.S. PATENT DOCUMENTS

| | | | |
|---|---|---|---|
| 11,558,788 B2* | 1/2023 | Rasanen | H04W 88/16 |
| 2016/0366244 A1* | 12/2016 | Chiu | H04L 67/1008 |
| 2017/0118311 A1* | 4/2017 | Frydman | H04L 67/145 |
| 2019/0034917 A1* | 1/2019 | Nolan | G06K 7/10475 |
| 2020/0205040 A1* | 6/2020 | Jin | H04W 36/0055 |

* cited by examiner

APPLICATION INSTANCE SWITCHING METHOD AND APPARATUS

CROSS-REFERENCE TO RELATED APPLICATIONS

This application is a continuation of International Application No. PCT/CN2021/088136, filed on Apr. 19, 2021, which claims priority to Chinese Patent Application No. 202010603843.6, filed on Jun. 29, 2020. The disclosures of the aforementioned applications are hereby incorporated by reference in their entireties.

TECHNICAL FIELD

The embodiments relate to the communication field, a communication method, and a communication apparatus in the communication field.

BACKGROUND

Multi-access edge computing (MEC) may provide a cloud computing-based capability for a mobile user at an edge of an operator network close to the user, so that the user may deploy an application at the edge of the network by using the capability. After the cloud computing capability is deployed at the edge of the network, a carrier-class service environment that ensures high performance, a low latency, and high bandwidth may be created, to accelerate delivery and downloading of content, services, and applications in the network. Then, a consumer can enjoy network experience with higher quality.

With development of a communication system, a core network may be divided into a centralized control plane network function and a distributed user plane network function. When a terminal device moves between different areas, the control plane network function may select an appropriate user plane network function. Therefore, user plane network function handover occurs, and an application instance corresponding to a user plane network function also needs to be switched. Currently, a method that can be used for application instance switching in an MEC scenario urgently needs to be provided.

SUMMARY

The embodiments may provide a communication method and a communication apparatus that can be used for application instance switching in an MEC scenario, to help ensure service continuity, and therefore ensure user experience.

According to a first aspect, a communication method is provided. The communication method includes: A multi-access edge computing MEC network element obtains information about a source application instance of an application accessed by a terminal device and information about a target application instance of the application. The MEC network element sends a first message to a first MEC platform, where the first message is used to request to migrate a user context of the application from the source application instance to the target application instance, the source application instance is deployed on the first MEC platform, and the target application instance is deployed on a second MEC platform. The MEC network element receives a second message from the first MEC platform, where the second message indicates a migration state of the user context of the application.

According to the communication method in this embodiment, the MEC network element obtains the information about the source application instance and the information about the target application instance, and sends the first message to the first MEC platform to request to migrate the user context of the application, so that application instance-based migration of the user context of the application can be implemented in an MEC scenario. This helps ensure service continuity, and therefore ensure user experience.

The migration state of the user context may include a state indicating migration is started, a state indicating migration is completed, a state indicating migration failed, or the like. Due to movement of the terminal device, a data network is switched, and an MEC platform corresponding to the data network is also switched, switched from the first MEC platform to the second MEC platform. In this embodiment, before moving, the terminal device accesses the application by using the source application instance of the first MEC platform. After moving, when the migration state of the user context indicates that migration is completed, the terminal device may access the application by using the target application instance of the second MEC platform.

With reference to the first aspect, in some implementations of the first aspect, before the multi-access edge computing MEC network element obtains the information about the source application instance and the information about the target application instance, the method further includes: The MEC network element receives a third message from a core network control plane network element, where the third message is used to notify that a user plane path of the terminal device has changed. That a multi-access edge computing MEC network element obtains information about a source application instance and information about a target application instance includes: The MEC network element determines the information about the source application instance and the information about the target application instance based on the third message, where the source application instance is located at a location corresponding to an access identifier of a source data network, and the target application instance is located at a location corresponding to an access identifier of a target data network.

With reference to the first aspect, in some implementations of the first aspect, the method further includes: The MEC network element sends a fourth message to the core network control plane network element based on the second message, where the fourth message is a positive acknowledgment or a negative acknowledgment for the third message.

For example, after completing migration of the user context between the source application instance and the target application instance, the MEC network element may send the fourth message to the core network control plane network element. If the fourth message is the positive acknowledgment, it indicates that the MEC network element accepts the migration of the user context of the application, and the migration state of the user context of the application is the state indicating migration is completed. In this way, the core network control plane network element may activate a new user plane path, so that the terminal device accesses the application by using the target application instance corresponding to the new user plane path. If the fourth message is the negative acknowledgment, it indicates that the MEC network element rejects the migration of the user context of the application, or the migration state of the user context of the application is the state indicating migration failed. In this case, the terminal device still accesses the application by using the source application instance corresponding to the old user plane path.

With reference to the first aspect, in some implementations of the first aspect, the third message includes at least one of the following information: an identifier of the terminal device, an identifier of the application, the access identifier of the source data network, and the access identifier of the target data network.

The MEC network element may determine, based on the identifier of the application accessed by the terminal device and the access identifier of the source data network, the information about the source application instance corresponding to the application in the source data network; the MEC network element may determine, based on the identifier of the application accessed by the terminal device and the access identifier of the target data network, the information about the target application instance corresponding to the application in the target data network.

With reference to the first aspect, in some implementations of the first aspect, before the MEC network element receives the third message from the core network control plane network element, the method further includes: The MEC network element sends a fifth message to the core network control plane network element, where the fifth message is used to subscribe to a user plane path change event of the terminal device.

That the MEC network element sends a fifth message to the core network control plane network element is to help the core network control plane network element send the third message to the MEC network element when the user plane path of the terminal device changes. It should be understood that that the user plane path changes means that the terminal device moves and the user plane path of the terminal device needs to be changed. However, in this case, the new user plane path is not activated, and the terminal device still accesses the application by using the source application instance.

With reference to the first aspect, in some implementations of the first aspect, the MEC network element is an MEC orchestrator or an MEC platform manager. Alternatively, the MEC network element in this embodiment can implement functions of at least one network element in the MEC orchestrator or the MEC platform manager.

With reference to the first aspect, in some implementations of the first aspect, the MEC network element includes an MEC orchestrator and an MEC platform manager, and that the MEC network element sends a first message to a first MEC platform includes: The MEC orchestrator sends the first message to the first MEC platform through the MEC platform manager. That the MEC network element receives a second message from the first MEC platform includes: The MEC orchestrator receives the second message from the first MEC platform through the MEC platform manager.

The MEC orchestrator may determine the information about the source application instance and the information about the target application instance based on the third message sent by the core network control plane network element. "The MEC orchestrator sends the first message to the first MEC platform through the MEC platform manager" means that the MEC orchestrator first sends the first message to the MEC platform manager, and then the MEC platform manager forwards the first message to the first MEC platform. Similarly, "the MEC orchestrator receives the second message from the first MEC platform through the MEC platform manager" means that the first MEC platform first sends the second message to the MEC platform manager, and then the MEC platform manager forwards the second message to the MEC orchestrator.

With reference to the first aspect, in some implementations of the first aspect, the method further includes: The MEC orchestrator sends a sixth message to the MEC platform manager, where the sixth message is used to subscribe to the migration state of the user context of the application. The MEC platform manager receives the sixth message and sends a first acknowledgment message to the MEC orchestrator. The MEC orchestrator receives the first acknowledgment message.

With reference to the first aspect, in some implementations of the first aspect, the method further includes: The MEC platform manager sends a seventh message to the first MEC platform, where the seventh message is used to subscribe to the migration state of the user context of the application. The MEC platform manager receives a second acknowledgment message from the first MEC platform.

With reference to the first aspect, in some implementations of the first aspect, that the MEC orchestrator receives the second message from the first MEC platform through the MEC platform manager includes: The MEC platform manager receives the second message from the first MEC platform. The MEC platform manager sends a third acknowledgment message to the MEC platform. The MEC platform manager sends the second message to the MEC orchestrator. The MEC orchestrator receives the second message and sends a fourth acknowledgment message to the MEC platform manager. The MEC platform manager receives the fourth acknowledgment message.

According to a second aspect, another communication method is provided. The communication method includes: A first multi-access edge computing MEC platform receives a third message from a core network control plane network element, where the third message is used to notify that a user plane path of a terminal device has changed. The first MEC platform obtains, based on the third message, information about a source application instance of an application accessed by the terminal device and information about a target application instance of the application. The first MEC platform migrates a user context of the application from the source application instance to the target application instance, where the source application instance is deployed on the first MEC platform, and the target application instance is deployed on a second MEC platform.

With reference to the second aspect, in some implementations of the second aspect, that the first MEC platform obtains, based on the third message, information about a source application instance of an application accessed by the terminal device and information about a target application instance of the application includes: The first MEC platform sends a request message to an MEC orchestrator based on the third message, where the request message is used to request the information about the target application instance. The first MEC platform receives the information that is about the target application instance and that is sent by the MEC orchestrator.

With reference to the second aspect, in some implementations of the second aspect, the method further includes: The first MEC platform sends a fourth message to the core network control plane network element, where the fourth message is a positive acknowledgment or a negative acknowledgment for the third message.

With reference to the second aspect, in some implementations of the second aspect, the third message includes at least one of the following information: an identifier of the terminal device, an identifier of the application, an access identifier of a source data network, and an access identifier of a target data network.

With reference to the second aspect, in some implementations of the second aspect, before the first multi-access edge computing MEC platform receives the third message from the core network control plane network element, the method further includes: The first MEC platform sends a fifth message to the core network control plane network element, where the fifth message is used to subscribe to a user plane path change event of the terminal device.

According to a third aspect, a communication apparatus is provided. The apparatus is configured to perform the method according to any possible implementation of the foregoing aspects. The apparatus may include units configured to perform the method according to any possible implementation of the foregoing aspects.

According to a fourth aspect, a communication apparatus is provided. The apparatus includes a processor. The processor may be coupled to a memory and may be configured to execute instructions in the memory, to implement the method according to any possible implementation of the foregoing aspects. Optionally, the apparatus may further include the memory. Optionally, the apparatus may further include a communication interface, and the processor is coupled to the communication interface.

In an implementation, the communication apparatus is an MEC network element. When the communication apparatus is the MEC network element, the communication interface may be a transceiver or an input/output interface.

In another implementation, the communication apparatus is a chip disposed in an MEC network element. When the communication apparatus is the chip disposed in the MEC network element, the communication interface may be an input/output interface.

According to a fifth aspect, a processor is provided. The processor includes an input circuit, an output circuit, and a processing circuit. The processing circuit is configured to receive a signal through the input circuit, and transmit a signal through the output circuit, so that the processor performs the method according to any possible implementation of the foregoing aspects.

In an implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Implementations of the processor and the various circuits are not limited in the embodiments.

According to a sixth aspect, a processing apparatus is provided. The processing apparatus includes a processor and a memory. The processor is configured to read instructions stored in the memory, receive a signal through a receiver, and transmit a signal through a transmitter, to perform the method according to any possible implementation of the foregoing aspects.

Optionally, there are one or more processors, and there are one or more memories.

Optionally, the memory may be integrated with the processor, or the memory and the processor are disposed separately.

In an implementation process, the memory may be a non-transitory (non-transitory) memory, for example, a read-only memory (ROM). The memory and the processor may be integrated into one chip or may be separately disposed in different chips. A type of the memory and a manner of disposing the memory and the processor are not limited in the embodiments.

It should be understood that, a related data exchange process such as sending of indication information may be a process of outputting the indication information from the processor, and receiving of capability information may be a process of receiving the input capability information by the processor. Data output by the processor may be output to the transmitter, and input data received by the processor may be from the receiver. The transmitter and the receiver may be collectively referred to as a transceiver.

The processing apparatus in the foregoing sixth aspect may be a chip, and the processor may be implemented by hardware or software. When the processor is implemented by hardware, the processor may be a logic circuit, an integrated circuit, or the like. When the processor is implemented by software, the processor may be a general-purpose processor, and the processor is implemented by reading software code stored in the memory. The memory may be integrated into the processor or may be located outside the processor and exist independently.

According to a seventh aspect, a computer program product is provided. The computer program product includes a computer program (which may also be referred to as code or instructions). When the computer program is run, a computer is enabled to perform the method according to any possible implementation of the foregoing aspects.

According to an eighth aspect, a non-transitory computer-readable storage medium is provided. The non-transitory computer-readable storage medium stores a computer program (which may also be referred to as code or instructions). When the computer program is run on a computer, the computer is enabled to perform the method according to any possible implementation of the foregoing aspects.

According to a ninth aspect, a communication system is provided. The communication system includes the foregoing MEC network element and MEC platform.

DETAILED DESCRIPTION OF THE EMBODIMENTS

Figure 1:
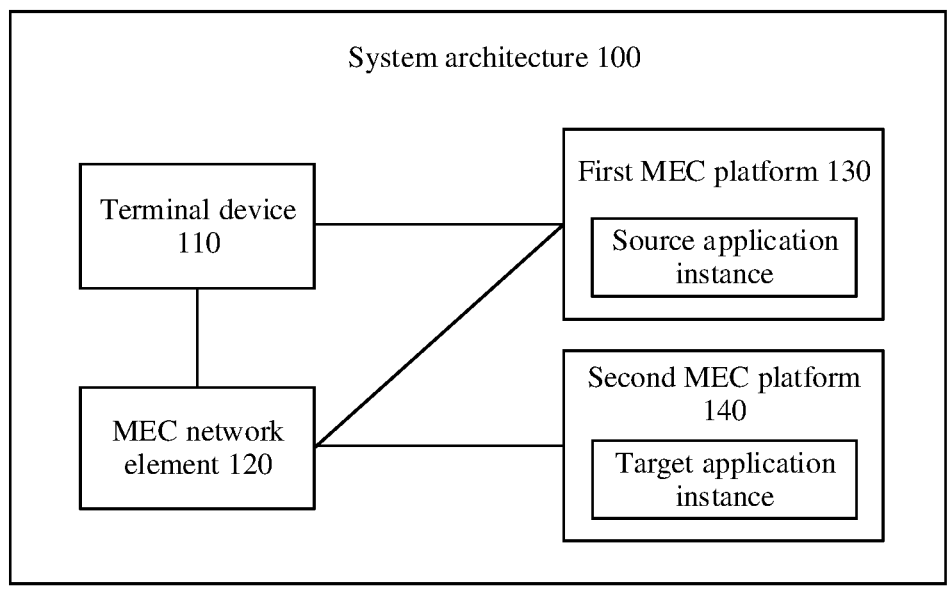
FIG. 1 is a schematic diagram of a system architecture according to an embodiment.

The following describes the embodiments with reference to the accompanying drawings.

The embodiments may be applied to various communication systems, for example, a long term evolution (LTE) system, an LTE frequency division duplex (FDD) system, an LTE time division duplex (TDD) system, a universal mobile telecommunication system (UMTS), a 5th generation (5G) system, or a new radio (NR) system.

A terminal device in the embodiments may also be referred to as user equipment (UE), a mobile station (MS), a mobile terminal (MT), an access terminal, a subscriber unit, a subscriber station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device having a wireless connection function. Currently, some terminals are, for example, a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving (self-driving), a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a hand-held device or a computing device that has a wireless communication function or another processing device connected to a wireless modem, a vehicle-mounted device, a wearable device, a terminal device in a 5G network, and a terminal device in a future evolved public land mobile network (PLMN). This is not limited in the embodiments.

By way of example, and not limitation, in the embodiments, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, such as smart watches or smart glasses, and devices that focus on only one type of application function and need to work with other devices such as smartphones, such as various smart bands or smart jewelry for monitoring physical signs.

In addition, in the embodiments, the terminal device may alternatively be a terminal device in an internet of things (IoT) system. IoT is an important part of future development of information technologies. A feature of the IoT is connecting a thing to a network by using a communication technology, to implement an intelligent network for interconnection between a person and a machine or between things.

A network device in the embodiments may be a device configured to communicate with a terminal device. The network device may be a transmission reception point (TRP), an evolved NodeB (eNB) in an LTE system, a home base station (HNB), a baseband unit (BBU), or a wireless controller in a cloud radio access network (CRAN) scenario. Alternatively, the access network device may be a relay station, an access point, a vehicle-mounted device, a wearable device, an access network device in a 5G network, an access network device in a future evolved public land mobile network (PLMN), or the like; or may be an access point (AP) in a WLAN or a gNB in a new radio (NR) system. This is not limited in the embodiments. In a network structure, the access network device may include a central unit (CU) node, a distributed unit (DU) node, a RAN device including a CU node and a DU node, or a RAN device including a CU control plane (CU-CP) node, a CU user plane (CU-UP) node, and a DU node.

In the embodiments, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a structure of an execution body of a method provided in the embodiments is not particularly limited, provided that a program that records code of the method provided in the embodiments can be run to perform communication according to the method. For example, the execution body of the method provided in the embodiments may be a terminal device or a network device, or a functional module that can invoke and execute the program in the terminal device or the network device.

In addition, aspects or features may be implemented as a method, an apparatus, or a product using standard programming and/or engineering technologies. The term "product" covers a computer program that can be accessed from any computer-readable component, carrier or medium. For example, the computer-readable medium may include, but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in the embodiments may represent one or more devices and/or other machine-readable media that are configured to store information. The term "machine-readable media" may include, but is not limited to, a wireless channel, and various other media that can store, include, and/or carry instructions and/or data.

To facilitate understanding of the embodiments, related terms are first described.

1. Multi-Access Edge Computing (MEC)

Running at a network edge, the MEC may provide big data services, internet of things services, and data services, and open application programming interfaces (APIs) for third parties to quickly deploy new services. An MEC server usually has a high computing capability and is suitable for analyzing and processing a large amount of data. The MEC server includes three parts: a bottom-layer infrastructure, a middle-layer MEC platform, and an upper-layer application.

2. Application

The application is actually application instance(s), and application instances are copies of the same application. The application instance is deployed on an edge node on which the application instance needs to be deployed. An application instance of an edge node provides a service for an application on a terminal device at a moment. Usually, a shorter distance between the application instance and a location of the terminal device indicates a lower packet transmission delay between the application and the terminal device and higher quality of service. When the terminal device is at a location 1, an application instance 1 of an edge node 1 located at the location 1 is an optimal application instance of the terminal device. When the terminal device moves to a location 2, an application instance 2 of an edge node 2 located at the location 2 is the optimal application instance of the terminal device.

A physical entity of the edge node is an MEC platform. For ease of description, the following uses the MEC platform as an example for description.

With reference to FIG. 1, the following describes in detail a system architecture applicable to an embodiment of this application. The system architecture 100 shown in FIG. 1 includes a terminal device 110, an MEC network element 120, a first MEC platform 130, and a second MEC platform 140. A source application instance is deployed on the first MEC platform 130, and a target application instance is deployed on the second MEC platform 140.

When the terminal device 110 is located near a location of the first MEC platform 130, the terminal device 110 may access the source application instance through the first MEC platform 130. When the terminal device moves and is located near a location of the second MEC platform 140, the terminal device 110 may access the target application instance through the second MEC platform 140. The source application instance and the target application instance herein are different copies of a same application. The MEC network element 120 is configured to manage and deploy an MEC platform.

It should be understood that the terminal device 110 may access the foregoing application instance through a core network element, and the core network element is not shown in FIG. 1. In a possible implementation, the core network element may include a centralized control plane network function network element and a distributed user plane network function network element. When the terminal device moves between different areas, the control plane network function network element may select an appropriate user plane network function network element. Therefore, user plane network function network element handover occurs, and an application instance corresponding to a user plane network function network element also needs to be switched. The application instance may be switched from the source application instance to the target application instance.

The European Telecommunications Standards Institute (ETSI) defines an MEC reference point architecture in the specification ETSI GS MEC 003. The following describes in detail the reference point architecture with reference to FIG. 2.

Figure 2:
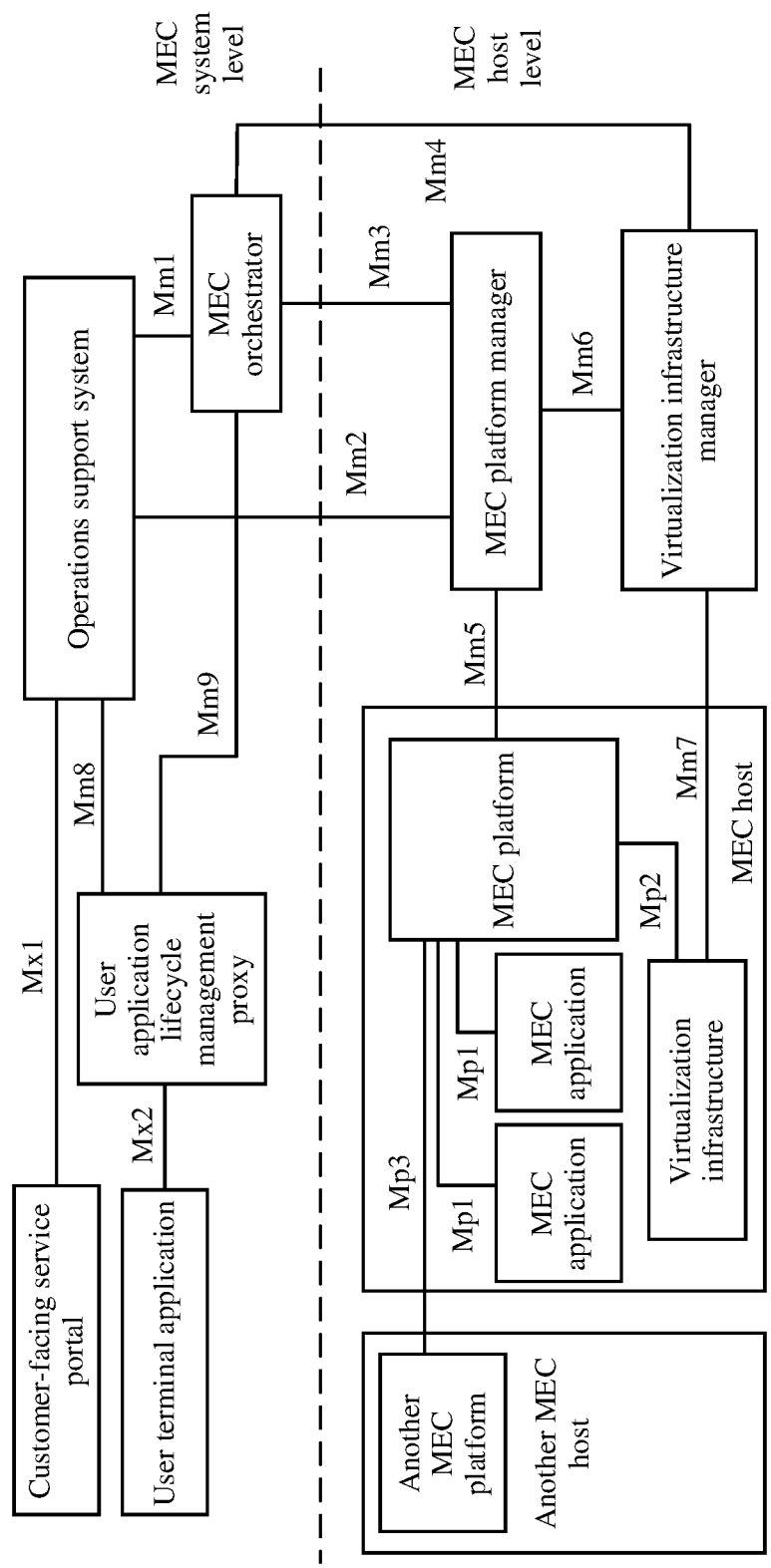
FIG. 2 is a schematic diagram of another system architecture according to an embodiment.

FIG. 2 shows another system architecture 200 according to an embodiment. As shown in FIG. 2, the system architecture 200 may include two parts: an MEC system level and an MEC host level. The MEC system level is responsible for global control of an MEC system, and may include the following network elements:

1. MEC host: The MEC host includes an MEC platform, a virtualization infrastructure, and MEC applications.

The virtualization infrastructure provides virtualized computing, storage, and network resources for the MEC applications, and may provide persistent storage-related information and time-related information for the MEC applications. The virtualization infrastructure includes a data forwarding plane that executes a forwarding rule for data received from the MEC platform, and routes traffic among various applications, services, and networks.

The MEC platform is the core of the MEC reference point architecture. The MEC platform receives a traffic forwarding rule from an MEC platform manager, the MEC application, or an MEC service, and delivers an instruction to the forwarding plane based on the forwarding rule. The MEC platform provides a service registration function, a service discovery function, a common service function, and the like, and may provide modules such as a traffic offload function (TOF), a radio network information service (RNIS), a communication service, and a service registry, to provide services for upper-layer application instances through these modules. The MEC platform further supports configuration of a local domain name system (DNS) proxy/server and may redirect data traffic to corresponding applications and services. The MEC platform may further communicate with another MEC platform through an Mp3 reference point. In a collaboration mechanism of a distributed MEC system, the Mp3 reference point may be used as a basis for interconnection between different MEC platforms.

The MEC applications are virtual machine instances running on the MEC virtualization infrastructure. These applications communicate with the MEC platform through an Mp1 reference point. The Mp1 reference point may further provide additional functions such as identifying application availability and preparing or relocating an application state for a user when MEC handover occurs.

2. MEC orchestrator: The MEC orchestrator is a core function provided by the MEC. The MEC orchestrator may implement overall control of resources and a capability of an MEC network, including all deployed MEC hosts and services, available resources on each host, instantiated MEC applications, and a network topology. When selecting a to-be-accessed target MEC host for a user, the MEC orchestrator may measure a user requirement and available resources of each host and select a most appropriate MEC host for the user. If the user needs to perform MEC host handover, the MEC orchestrator triggers a handover program.

The MEC orchestrator and an operations support system trigger instantiation and termination of an MEC application through an Mm1 reference point. An Mm4 reference point between the MEC orchestrator and a virtualization infrastructure manager is used to manage virtualized resources and virtual machine images of applications and maintain state information of available resources.

3. MEC platform manager: The MEC platform manager is configured to manage the MEC platform, lifecycles of MEC applications, and MEC application rules and requirements. Management of the lifecycles of the MEC applications includes creating and terminating MEC application programs and providing indication messages of application-related events for the MEC orchestrator. Management of the MEC application rules and requirements includes authentication, traffic rules, DNS configuration, and resolving conflicts.

An Mm5 reference point is used between the MEC platform and the MEC platform manager. The reference point may implement platform configuration and traffic filtering rule configuration and is responsible for managing application relocation and supporting application lifecycle programs. Mm2 is a reference point between the operations support system and the MEC platform manager and is responsible for configuration and performance management of the MEC platform. Mm3 is a reference point between the MEC orchestrator and the MEC platform manager and is responsible for supporting lifecycle management of the MEC applications and MEC application-related policies and providing time-related information for available MEC services.

4. Virtualization infrastructure manager: The virtualization infrastructure manager is configured to manage virtualized resources required by MEC applications. Management tasks include allocation and release of virtualized computing, storage, and network resources. Software images can also be stored on the virtualization infrastructure manager for quick instantiation of the MEC applications. In addition, the virtualization infrastructure manager is further responsible for collecting information about virtual resources and reporting the information to upper-layer management entities such as the MEC orchestrator and the MEC platform manager through the Mm4 reference point and an Mm6 reference point respectively.

5. Operations support system: From a perspective of the MEC system, the operations support system is the highest level of management entity that supports system running. The operations support system receives requests for instantiating or terminating MEC applications from a customer-facing service CFS) portal and a terminal device (for example, UE), and checks integrity and authorization information of application data packets and the requests. Request data packets authenticated and authorized by the operations support system are forwarded to the MEC orchestrator through the Mm1 reference point for further processing.

6. Customer-facing service (CFS) portal: The CFS portal is equivalent to a third-party access point. A developer uses this interface to connect various applications developed by the developer to an MEC system of an operator, and enterprises or individual users can also use this interface to select applications that they are interested in and specify time and places for using the applications. The CFS portal may communicate with the operations support system through an Mx1 reference point.

7. User application lifecycle management (LCM) proxy: The user app LCM proxy is an entity used by an MEC user to request application-related services such as instantiation and termination. The entity may implement application relocation between an external cloud and the MEC system and is responsible for authenticating all requests from the external cloud, and then sending the requests to the operations support system and the MEC orchestrator through Mm8 and Mm9 reference points respectively for further processing. It should be noted that the user application lifecycle proxy can be accessed only through a mobile network, and an Mx2 reference point provides a basis for mutual communication between the terminal device and the user application lifecycle proxy.

It should be understood that in the system architecture 100, the MEC network element 120 may implement functions of at least one network element in the MEC orchestrator or the MEC platform manager in FIG. 2. This is not limited in the embodiments.

It should be further understood that the system architecture 200 includes three different types of reference points. Mp represents a reference point related to an MEC platform application, Mm represents a reference point related to management, and Mx represents a reference point related to an external entity.

The foregoing system architecture 200 applied to this embodiment is merely an example of a network architecture described from a perspective of a reference point architecture, and a network architecture applicable to this embodiment is not limited thereto. Any network architecture that can implement functions of the foregoing network elements is applicable to this embodiment.

It should be noted that names of interfaces between the network elements in FIG. 2 are only examples, and the interfaces may have other names in implementations. This is not limited in this embodiment.

It should be noted that names of the network elements (for example, the MEC orchestrator and the MEC platform manager) included in FIG. 2 are merely examples and constitute no limitation on functions of the network elements. In another future network, the foregoing network elements may alternatively have other names. This is not limited in this embodiment. For example, in a 6G network, some or all of the foregoing network elements may use terms in 5G, or may use other names, or the like. This is uniformly described herein. Details are not described below. In addition, it should be understood that names of messages (or signaling) transmitted between the foregoing network elements are merely examples, and do not constitute any limitation on functions of the messages.

Figure 3:
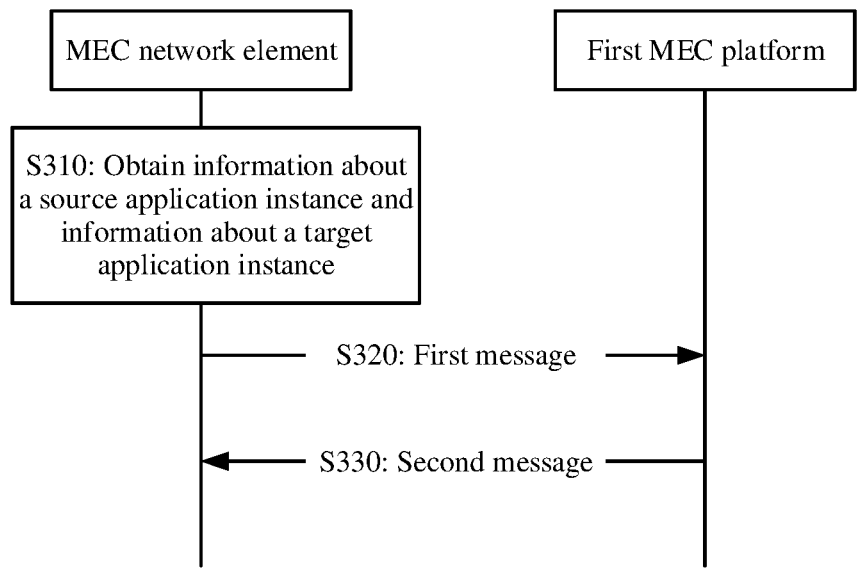
FIG. 3 is a schematic flowchart of a communication method according to an embodiment.

FIG. 3 is a schematic flowchart of a communication method 300 according to an embodiment. The method 300 may be applied to the system architecture 100 shown in FIG. 1 or may be applied to the system architecture 200 shown in FIG. 2. This embodiment is not limited thereto.

S310: An MEC network element obtains information about a source application instance of an application accessed by a terminal device and information about a target application instance of the application.

S320: The MEC network element sends a first message to a first MEC platform, where the first message is used to request to migrate a user context of the application from the source application instance to the target application instance, the source application instance is deployed on the first MEC platform, and the target application instance is deployed on a second MEC platform. Correspondingly, the first MEC platform receives the first message.

S330: The first MEC platform sends a second message to the MEC network element, where the second message indicates a migration state of the user context of the application. Correspondingly, the MEC network element receives the second message from the first MEC platform.

The migration state of the user context may include a state indicating migration is started, a state indicating migration is completed, a state indicating migration failed, or the like. Due to movement of the terminal device, a data network is switched, and an MEC platform corresponding to the data network is also switched, switched from the first MEC platform to the second MEC platform. In this embodiment of this application, before moving, the terminal device accesses the application by using the source application instance of the first MEC platform. After moving, when the migration state of the user context indicates that migration is completed, the terminal device may access the application by using the target application instance of the second MEC platform.

According to the communication method in this embodiment, the MEC network element obtains the information about the source application instance and the information about the target application instance, and sends the first message to the first MEC platform to request to migrate the user context of the application, so that application instance-based migration of the user context of the application can be implemented in an MEC scenario. This helps ensure service continuity, and therefore ensure user experience.

Optionally, the MEC network element in this embodiment is an MEC orchestrator or an MEC platform manager. Alternatively, the MEC network element in this embodiment can implement functions of at least one network element in the MEC orchestrator or the MEC platform manager.

In a possible implementation, before the MEC network element obtains the information about the source application instance and the information about the target application instance, the method further includes: The MEC network element receives a third message from a core network control plane network element, where the third message is used to notify that a user plane path of the terminal device has changed. That an MEC network element obtains information about a source application instance and information about a target application instance includes: The MEC network element determines the information about the source application instance and the information about the target application instance based on the third message, where the source application instance is located at a location corresponding to an access identifier of a source data network, and the target application instance is located at a location corresponding to an access identifier of a target data network.

Optionally, the third message includes at least one of the following information: an identifier of the terminal device, an identifier of the application, the access identifier of the source data network, and the access identifier of the target data network. The MEC network element may determine, based on the identifier of the application accessed by the terminal device and the access identifier of the source data network, the information about the source application instance corresponding to the application in the source data network; the MEC network element may determine, based on the identifier of the application accessed by the terminal device and the access identifier of the target data network, the information about the target application instance corresponding to the application in the target data network.

In an optional embodiment, the method further includes: The MEC network element sends a fourth message to the core network control plane network element based on the second message, where the fourth message is a positive acknowledgment or a negative acknowledgment for the third message.

For example, after completing migration of the user context between the source application instance and the target application instance, the MEC network element may send the fourth message to the core network control plane network element. If the fourth message is the positive acknowledgment, it indicates that the MEC network element accepts the migration of the user context of the application, and the migration state of the user context of the application is the state indicating migration is completed. In this way, the core network control plane network element may activate a new user plane path, so that the terminal device accesses the application by using the target application instance corresponding to the new user plane path. If the fourth message is the negative acknowledgment, it indicates that the MEC network element rejects the migration of the user context of the application, or the migration state of the user context of the application is the state indicating migration failed. In this case, the terminal device still accesses the application by using the source application instance corresponding to the old user plane path.

In an optional embodiment, before the MEC network element receives the third message from the core network control plane network element, the method further includes: The MEC network element sends a fifth message to the core network control plane network element, where the fifth message is used to subscribe to a user plane path change event of the terminal device. In this way, the core network control plane network element sends the third message to the MEC network element when the user plane path of the terminal device changes.

It should be understood that that the user plane path changes means that the terminal device moves and the user plane path of the terminal device needs to be changed. However, in this case, the new user plane path is not activated, and the terminal device still accesses the application by using the source application instance.

In a possible implementation, the MEC network element includes an MEC orchestrator and an MEC platform manager, and actions performed by the MEC network element may include: The MEC orchestrator obtains the information about the source application instance of the application accessed by the terminal device and the information about the target application instance of the application. The MEC orchestrator sends the first message to the first MEC platform through the MEC platform manager. The MEC orchestrator receives the second message from the first MEC platform through the MEC platform manager.

The MEC orchestrator may determine the information about the source application instance and the information about the target application instance based on the third message sent by the core network control plane network element. "The MEC orchestrator sends the first message to the first MEC platform through the MEC platform manager" means that the MEC orchestrator first sends the first message to the MEC platform manager, and then the MEC platform manager forwards the first message to the first MEC platform. Similarly, "the MEC orchestrator receives the second message from the first MEC platform through the MEC platform manager" means that the first MEC platform first sends the second message to the MEC platform manager, and then the MEC platform manager forwards the second message to the MEC orchestrator.

Optionally, the method further includes: The MEC orchestrator sends, to the MEC platform manager, a message used to subscribe to the migration state of the user context of the application. Correspondingly, the MEC platform manager receives the message. The MEC platform manager sends a first acknowledgment message to the MEC orchestrator, to indicate that the message used to subscribe to the migration state of the user context of the application is received. Correspondingly, the MEC orchestrator receives the first acknowledgment message.

Optionally, the method further includes: The MEC platform manager sends, to the first MEC platform, a message used to subscribe to the migration state of the user context of the application. Correspondingly, the first MEC platform receives the message. The first MEC platform sends a second acknowledgment message to the MEC platform manager, to indicate that the message used to subscribe to the migration state of the user context of the application is received. Correspondingly, the MEC platform manager receives the second acknowledgment message.

Optionally, that the MEC orchestrator receives the second message from the first MEC platform through the MEC platform manager includes: The first MEC platform sends, to the MEC platform manager, a message indicating the migration state of the user context. Correspondingly, the MEC platform manager receives the message. The MEC platform manager sends a third acknowledgment message to the first MEC platform, to indicate that the message indicating the migration state of the user context is received. Correspondingly, the first MEC platform receives the third acknowledgment message. The MEC platform manager sends, to the MEC orchestrator, a message indicating the migration state of the user context. Correspondingly, the MEC orchestrator receives the message. The MEC orchestrator sends a fourth acknowledgment message to the MEC platform manager, to indicate that the message indicating the migration state of the user context is received. Correspondingly, the MEC platform manager receives the fourth acknowledgment message.

Figure 4:
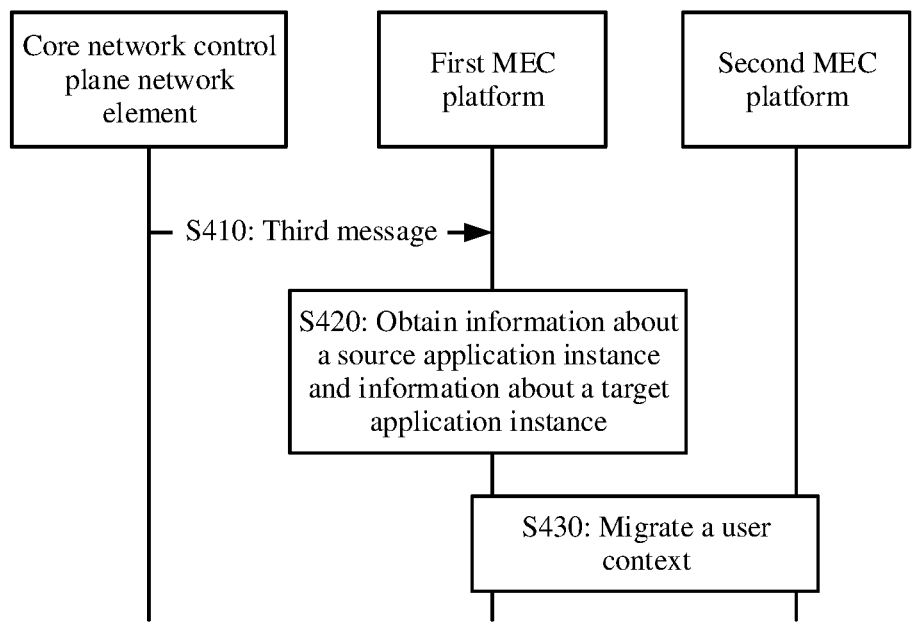
FIG. 4 is a schematic flowchart of another communication method according to an embodiment.

FIG. 4 is a schematic flowchart of a communication method 400 according to an embodiment. The method 400 may be applied to the system architecture 100 shown in FIG. 1 or may be applied to the system architecture 200 shown in FIG. 2. This embodiment is not limited thereto.

S410: A core network control plane network element sends a third message to a first multi-access edge computing MEC platform, where the third message is used to notify that a user plane path of a terminal device has changed. Correspondingly, the first MEC platform receives the third message.
  S420: The first MEC platform obtains, based on the third message, information about a source application instance of an application accessed by the terminal device and information about a target application instance of the application.
  S430: The first MEC platform migrates a user context of the application from the source application instance to the target application instance, where the source application instance is deployed on the first MEC platform, and the target application instance is deployed on a second MEC platform.

According to the communication method in this embodiment, the MEC platform obtains the information about the source application instance and the information about the target application instance, and then performs migration of the user context of the application, so that application instance-based migration of the user context of the application can be implemented in an MEC scenario. This helps ensure service continuity, and therefore ensure user experience.

In an optional embodiment, that the first MEC platform obtains, based on the third message, information about a source application instance of an application accessed by the terminal device and information about a target application instance of the application includes: The first MEC platform sends a request message to an MEC orchestrator based on the third message, where the request message is used to request the information about the target application instance. The first MEC platform receives the information that is about the target application instance and that is sent by the MEC orchestrator.

In an optional embodiment, the method further includes: The first MEC platform sends a fourth message to the core network control plane network element, where the fourth message is a positive acknowledgment or a negative acknowledgment for the third message.

In an optional embodiment, the third message includes at least one of the following information: an identifier of the terminal device, an identifier of the application, an access identifier of a source data network, and an access identifier of a target data network.

In an optional embodiment, before the first multi-access edge computing MEC platform receives the third message from the core network control plane network element, the method further includes: The first MEC platform sends a fifth message to the core network control plane network element, where the fifth message is used to subscribe to a user plane path change event of the terminal device.

For related details of the method 400, refer to the method 300. Details are not described herein again.

Figure 5:
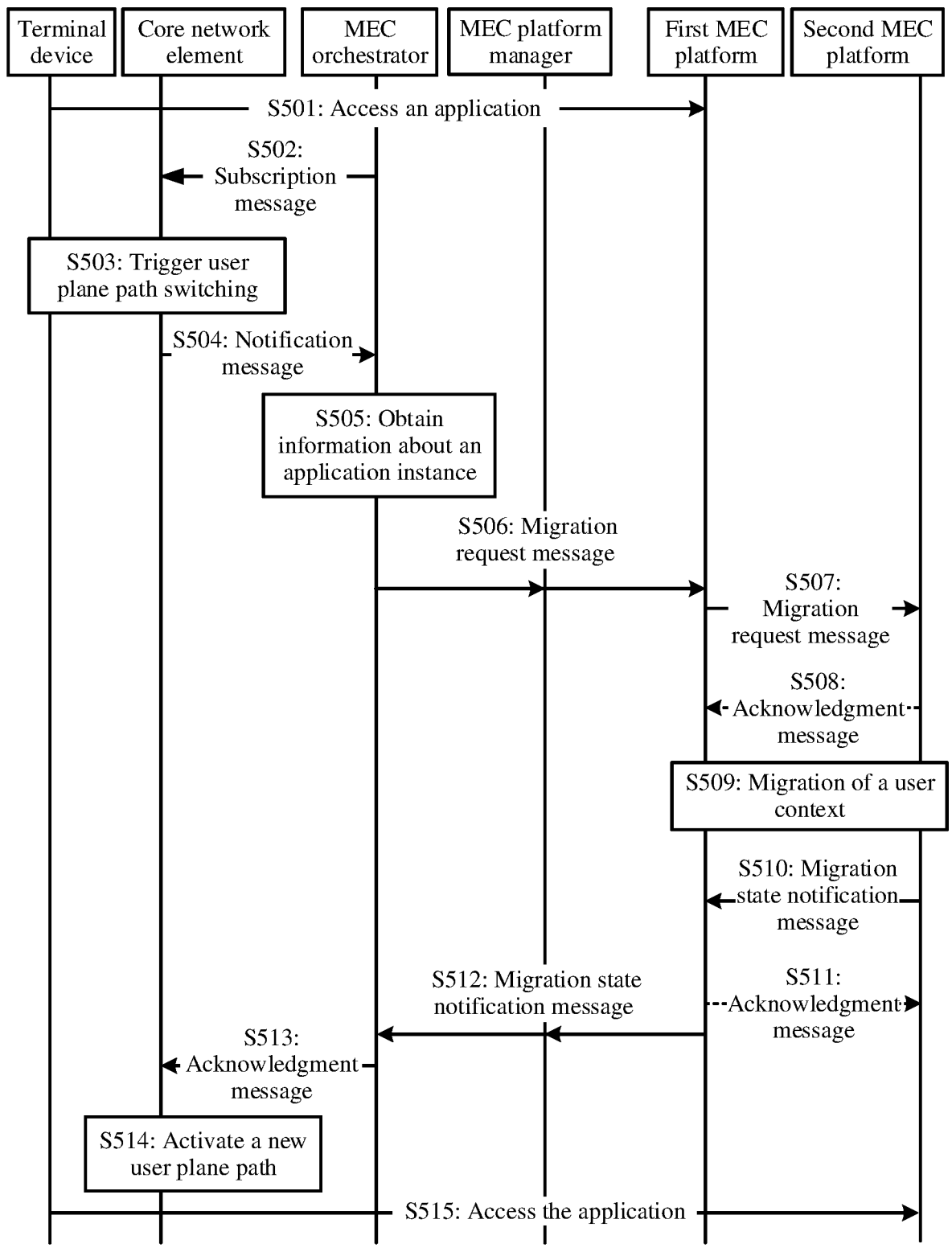
FIG. 5 is a schematic flowchart of another communication method according to an embodiment.

FIG. 5 is a schematic flowchart of another communication method 500 according to an embodiment. The method 500 may be applied to the system architecture 100 shown in FIG. 1 or may be applied to the system architecture 200 shown in FIG. 2. This embodiment is not limited thereto.

S501: A terminal device accesses an application by using a source application instance. The source application instance is deployed on a first MEC platform.
  S502: An MEC orchestrator sends a subscription message to a core network element, to subscribe to a user plane path change event. Correspondingly, the core network element receives the subscription message. The subscription message may be the fifth message in the method 300.

Optionally, the core network element may be a core network control plane network element, for example, a network exposure function (NEF) or a policy control function (PCF).

S503: Trigger user plane path switching when the terminal device moves.
  S504: Because the MEC orchestrator subscribes to the user plane path change event, the core network element sends a notification message to the MEC orchestrator, to notify, to the MEC orchestrator, that a user plane path of the terminal device has changed. Correspondingly, the MEC orchestrator receives the notification message. The notification message may be the third message in the method 300.

The notification message may also be referred to as a user plane path change event notification or may have another name.

Optionally, the notification message may include an identifier of the terminal device, an identifier of the application accessed by the terminal device, an access identifier of a source data network, and an access identifier of a target data network. For example, the identifier of the terminal device may be an internet protocol (IP) address of the terminal device, a generic public subscription identifier (GPSI) of the terminal device, or the like. This is not limited in this embodiment.

S505: The MEC orchestrator obtains, based on the notification message, information about the source application instance of the application accessed by the terminal device and information about a target application instance.

A data network may identify a deployment location of an application instance. The MEC orchestrator may determine, based on the identifier of the application accessed by the terminal device and the access identifier of the source data network, the information about the source application instance corresponding to the application in the source data network. The MEC orchestrator may determine, based on the identifier of the application accessed by the terminal device and the access identifier of the target data network, the information about the target application instance corresponding to the application in the target data network.

Optionally, the information about the source application instance includes an identifier of the source application instance, an IP address of the source application instance, and a port number of the source application instance; the information about the target application instance includes an identifier of the target application instance, an IP address of the target application instance, and a port number of the target application instance.

S506: The MEC orchestrator sends a migration request message to the first MEC platform through an MEC platform manager, to request to migrate user context information of the application. Correspondingly, the first MEC platform receives the migration request message through the MEC platform manager.

Optionally, the migration request message includes the identifier of the terminal device, the information about the source application instance, and the information about the target application instance.

S507: The first MEC platform sends a migration request message to a second MEC platform, to request to migrate the user context information of the application. Correspondingly, the second MEC platform receives the migration request message. The migration request message may be the first message in the method 300.

Optionally, the migration request message includes the identifier of the terminal device and the information about the target application instance.

Optionally, the first MEC platform may directly send the migration request message to the second MEC platform or may send the migration request message to the second MEC platform through a dedicated application mobility service entity. This is not limited in this embodiment.

Optionally, in S508, the second MEC platform sends an acknowledgment message to the first MEC platform, to indicate that the migration request message is received, and migration of a user context of the application is accepted. Correspondingly, the first MEC platform receives the acknowledgment message.

S509: Perform migration of the user context of the application between the first MEC platform and the second MEC platform.

S510: The second MEC platform sends a migration state notification message to the first MEC platform, to notify a migration state of the user context. The migration state of the user context may include a state indicating migration is started, a state indicating migration is completed, a state indicating migration failed, or the like. Correspondingly, the first MEC platform receives the migration state notification message. The migration state notification message may be the second message in the method 300.

Optionally, the second MEC platform may directly send the migration state notification message to the first MEC platform or may send the migration state notification message to the first MEC platform through the dedicated application mobility service entity. This is not limited in this embodiment.

Optionally, in S511, the first MEC platform sends an acknowledgment message to the second MEC platform, to indicate that the migration state notification message is received. Correspondingly, the second MEC platform receives the acknowledgment message.

S512: The first MEC platform sends the migration state notification message to the MEC orchestrator through the MEC platform manager. In this embodiment, the migration state notification message indicates that the migration of the user context is completed. Correspondingly, the MEC orchestrator receives the migration state notification message through the MEC platform manager.

The migration state notification message may also be referred to as a user context migration acknowledgment message or may have another name.

S513: The MEC orchestrator sends an acknowledgment message to the core network element, where the acknowledgment message is used to respond to the notification message in S504. In this embodiment, the acknowledgment message is a positive acknowledgment, indicating that the migration of the context is completed. Correspondingly, the core network element receives the acknowledgment message. The acknowledgment message may be the fourth message in the method 300.

The acknowledgment message may also be referred to as a user plane path change event acknowledgment message or may have another name.

S514: The core network element activates a new user plane path.

S515: The terminal device accesses the application by using the target application instance on the second MEC platform, that is, accesses the application through the new user plane path.

According to the communication method in this embodiment, application instance-based migration of the user context of the application can be implemented in an MEC scenario. This helps ensure service continuity, and therefore ensure user experience.

In the method 500, the MEC orchestrator, the MEC platform manager, and the first MEC platform exchange messages in a synchronization manner. The first MEC platform may send the user context migration acknowledgment message (that is, the seventh acknowledgment message) to the MEC orchestrator through the MEC platform manager only after detecting that the migration of the user context is completed. The following method 600 shows an example of another message exchange manner.

It should be understood that the method 600 shows only a message exchange process between an MEC orchestrator, an MEC platform manager, and a first MEC platform. Steps of other network elements (such as a terminal device and a core network element) are the same as those in the method 500, and details are not described again.

Figure 6:
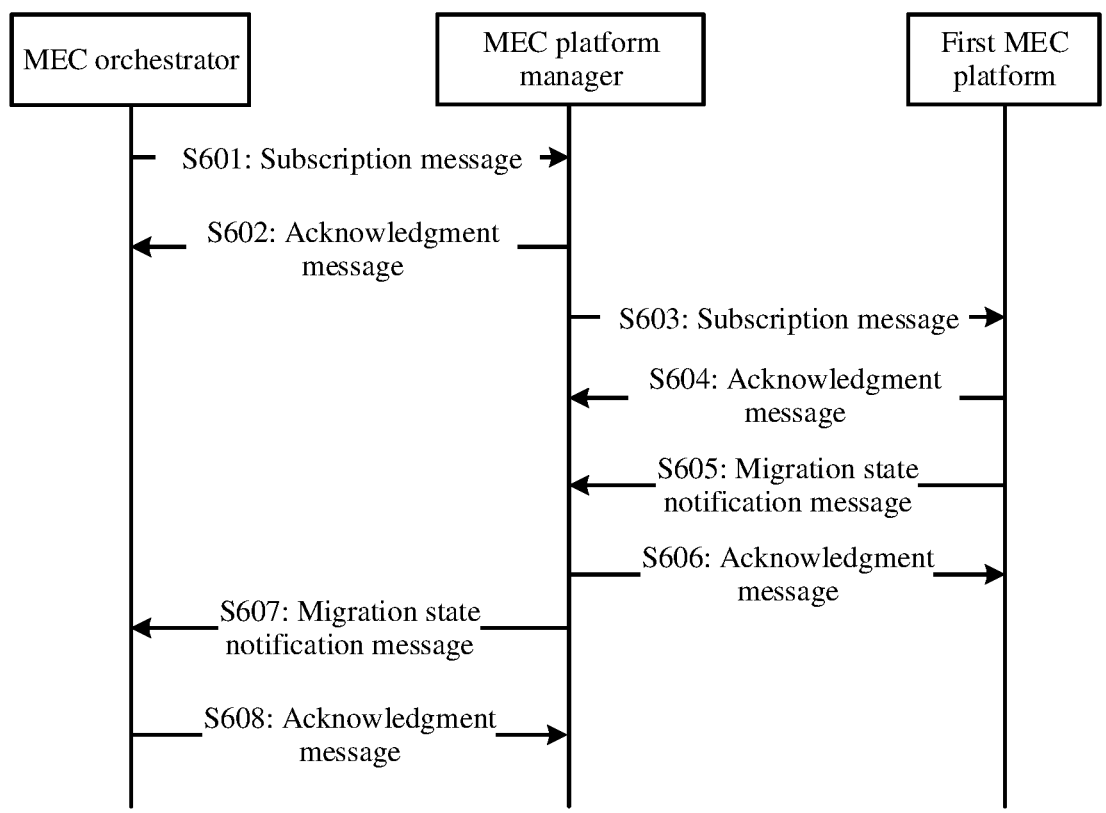
FIG. 6 is a schematic flowchart of another communication method according to an embodiment.

FIG. 6 is a schematic flowchart of another communication method 600 according to an embodiment. The method 600 may be applied to the system architecture 100 shown in FIG. 1 or may be applied to the system architecture 200 shown in FIG. 2. This embodiment is not limited thereto.

S601: The MEC orchestrator sends a subscription message to the MEC platform manager, to subscribe to a migration state of a user context. Correspondingly, the MEC platform manager receives the subscription message. The subscription message may be the sixth message in the method 300.

Optionally, the subscription message includes an identifier of the terminal device, an identifier of a source application instance, and an identifier of a target application instance.

S602: The MEC platform manager sends an acknowledgment message to the MEC orchestrator, to indicate that the subscription message is received. Correspondingly, the MEC orchestrator receives the acknowledgment message. The acknowledgment message may be the first acknowledgment message in the method 300.

S603: The MEC platform manager sends a subscription message to the first MEC platform, to subscribe to the migration state of the user context. Correspondingly, the first MEC platform receives the subscription message. The subscription message may be the seventh message in the method 300.

S604: The first MEC platform sends an acknowledgment message to the MEC platform manager, to indicate that the subscription message is received. Correspondingly, the MEC platform manager receives the acknowledgment message. The acknowledgment message may be the second acknowledgment message in the method 300.

S605: The first MEC platform sends a migration state notification message to the MEC platform manager, where the migration state notification message is used to notify the migration state of the user context. The migration state of the user context may include a state indicating migration is started, a state indicating migration is completed, a state indicating migration failed, or the like. Correspondingly, the MEC platform manager receives the migration state notification message.

S606: The MEC platform manager sends an acknowledgment message to the first MEC platform, to indicate that the migration state notification message is received. Correspondingly, the first MEC platform receives the acknowledgment message. The acknowledgment message may be the third acknowledgment message in the method 300.

S607: The MEC platform manager sends the migration state notification message to the MEC orchestrator. Correspondingly, the MEC orchestrator receives the migration state notification message.

S608: The MEC orchestrator sends an acknowledgment message to the MEC platform manager, to indicate that the migration state notification message is received. Correspondingly, the MEC platform manager receives the acknowledgment message. The acknowledgment message may be the fourth acknowledgment message in the method 300.

It should be understood that S605 to S608 may replace S512 in the method 500. In addition, S601 to S604 may be performed in any time period before S510. This is not limited in this embodiment.

Figure 7:
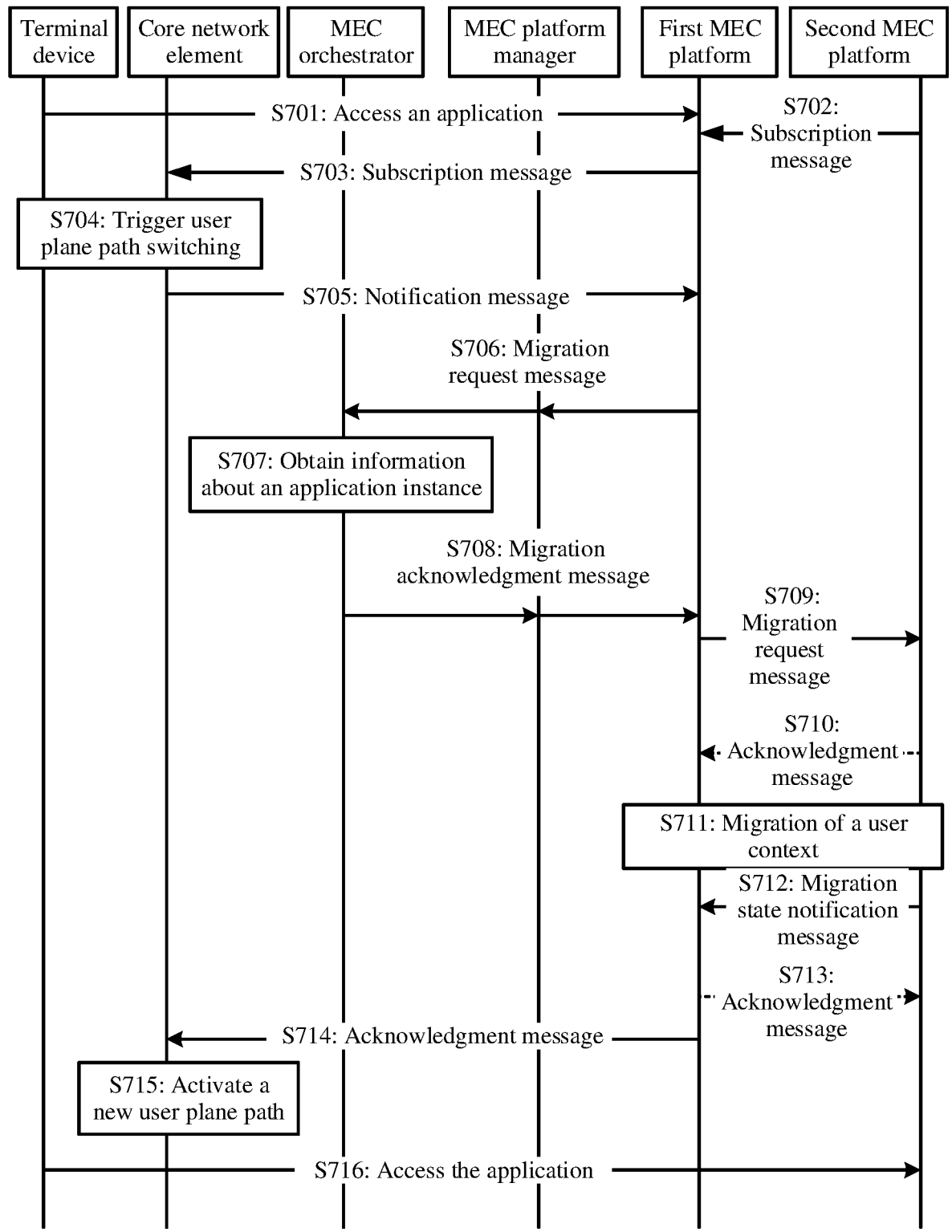
FIG. 7 is a schematic flowchart of another communication method according to an embodiment.

FIG. 7 is a schematic flowchart of another communication method 700 according to an embodiment. The method 700 may be applied to the system architecture 100 shown in FIG. 1 or may be applied to the system architecture 200 shown in FIG. 2. This embodiment is not limited thereto.

S701: A terminal device accesses an application by using a source application instance. The source application instance is deployed on a first MEC platform.

S702: The source application instance sends a subscription message to the first MEC platform, to subscribe to a mobility notification event of the terminal device. Correspondingly, the first MEC platform receives the subscription message. The subscription message may carry an identifier of the terminal device.

S703: The first MEC platform sends a subscription message to a core network element, to subscribe to a user plane path change event. Correspondingly, the core network element receives the subscription message. The subscription message may be the fifth message in the method 300.

Optionally, the core network element may be a core network control plane network element, for example, a network exposure function (NEF) or a policy control function (PCF).

S704: Trigger user plane path switching when the terminal device moves.

S705: Because the first MEC platform subscribes to the user plane path change event, the core network element sends a notification message to the first MEC platform, to notify, to the first MEC platform, that a user plane path of the terminal device has changed. Correspondingly, the first MEC platform receives the notification message. The notification message may be the third message in the method 300.

The notification message may also be referred to as a user plane path change event notification or may have another name.

Optionally, the notification message may include the identifier of the terminal device, an identifier of the application accessed by the terminal device, an access identifier of a source data network, and an access identifier of a target data network. For example, the identifier of the terminal device may be an internet protocol (IP) address of the terminal device, a generic public subscription identifier (GPSI) of the terminal device, or the like. This is not limited in this embodiment.

S706: The first MEC platform sends a migration request message to an MEC orchestrator through an MEC platform manager, where the migration request message may include at least one of the following information: the identifier of the terminal device, the identifier of the application, and the access identifier of the target data network. Correspondingly, the MEC orchestrator receives the migration request message.

S707: The MEC orchestrator determines, based on the migration request message, information about a target application instance of the application accessed by the terminal device.

A data network may identify a deployment location of an application instance. The MEC orchestrator may determine, based on the identifier of the application accessed by the terminal device and the access identifier of the target data network, the information about the target application instance corresponding to the application in the target data network.

Optionally, the information about the target application instance includes an identifier of the target application instance, an IP address of the target application instance, and a port number of the target application instance.

S708: The MEC orchestrator sends a migration acknowledgment message to the first MEC platform through the MEC platform manager. Correspondingly, the first MEC platform receives the migration acknowledgment message through the MEC platform manager.

Optionally, the migration acknowledgment message includes the identifier of the terminal device and the information about the target application instance.

S709: The first MEC platform sends a migration request message to a second MEC platform, to request to migrate user context information of the application. Correspondingly, the second MEC platform receives the migration request message. The migration request message may be the first message in the method 300.

Optionally, the migration request message includes the identifier of the terminal device and the information about the target application instance.

Optionally, the first MEC platform may directly send the migration request message to the second MEC platform or may send the migration request message to the second MEC platform through a dedicated application mobility service entity. This is not limited in this embodiment.

Optionally, in S710, the second MEC platform sends an acknowledgment message to the first MEC platform, to indicate that the migration request message is received, and migration of a user context of the application is accepted. Correspondingly, the first MEC platform receives the acknowledgment message.

S711: Perform migration of the user context of the application between the first MEC platform and the second MEC platform.

S712: The second MEC platform sends a migration state notification message to the first MEC platform, to notify a migration state of the user context. The migration state of the user context may include a state indicating migration is started, a state indicating migration is completed, a state indicating migration failed, or the like. Correspondingly, the first MEC platform receives the migration state notification message. The migration state notification message may be the second message in the method 300.

Optionally, the second MEC platform may directly send the migration state notification message to the first MEC platform or may send the migration state notification message to the first MEC platform through the dedicated application mobility service entity. This is not limited in this embodiment.

Optionally, in S713, the first MEC platform sends an acknowledgment message to the second MEC platform, to indicate that the migration state notification message is received. Correspondingly, the second MEC platform receives the acknowledgment message.

S714: The first MEC platform sends an acknowledgment message to the core network element, where the acknowledgment message is used to respond to the notification message in S705. In this embodiment, the acknowledgment message is a positive acknowledgment, indicating that the migration of the user context is completed. Correspondingly, the core network element receives the acknowledgment message. The acknowledgment message may be the fourth message in the method 300.

The acknowledgment message may also be referred to as a user plane path change event acknowledgment message or may have another name.

S715: The core network element activates a new user plane path.

S716: The terminal device accesses the application by using the target application instance on the second MEC platform, that is, accesses the application through the new user plane path.

According to the communication method in this embodiment, application instance-based migration of the user context of the application can be implemented in an MEC scenario. This helps ensure service continuity, and therefore ensure user experience.

It should be understood that in the foregoing embodiments, it is assumed that the target application instance already exists on the second MEC platform, and the user context of the application is migrated from the source application instance to the target application instance. If there is no target application instance on the second MEC platform, the target application instance needs to be created on the second MEC platform before the user context of the application is migrated. Details are not described herein.

It should be understood that sequence numbers of the foregoing processes do not mean an execution sequence. The execution sequence of the processes should be determined based on functions and internal logic of the processes and should not be constructed as any limitation on the implementation processes of the embodiments.

The foregoing describes in detail the communication methods in the embodiments with reference to FIG. 1 to FIG. 7. The following describes in detail communication apparatuses in the embodiments with reference to FIG. 8 and FIG. 9.

Figure 8:
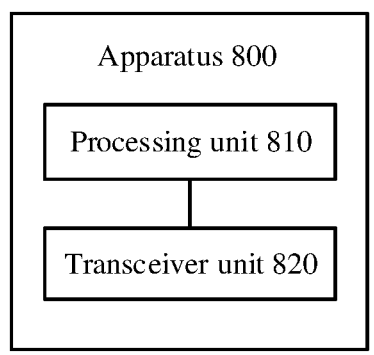
FIG. 8 is a schematic block diagram of a communication apparatus according to an embodiment.

FIG. 8 shows a communication apparatus 800 according to an embodiment. The apparatus 800 includes a processing unit 810 and a transceiver unit 820.

In a possible implementation, the apparatus 800 may be the foregoing MEC network element or may be a chip in the MEC network element and is configured to perform the procedures or steps corresponding to the MEC network element in the method 300.

The processing unit 810 is configured to obtain information about a source application instance of an application accessed by a terminal device and information about a target application instance of the application. The transceiver unit 820 is configured to send a first message to a first MEC platform, where the first message is used to request to migrate a user context of the application from the source application instance to the target application instance, the source application instance is deployed on the first MEC platform, and the target application instance is deployed on a second MEC platform. The transceiver unit 820 is further configured to receive a second message from the first MEC platform, where the second message indicates a migration state of the user context of the application.

Optionally, the transceiver unit 820 is further configured to receive a third message from a core network control plane network element, where the third message is used to notify that a user plane path of the terminal device has changed; and the processing unit 810 may be configured to determine the information about the source application instance and the information about the target application instance based on the third message, where the source application instance is located at a location corresponding to an access identifier of a source data network, and the target application instance is located at a location corresponding to an access identifier of a target data network.

Optionally, the transceiver unit 820 is further configured to send a fourth message to the core network control plane network element based on the second message, where the fourth message is a positive acknowledgment or a negative acknowledgment for the third message.

Optionally, the third message includes at least one of the following information: an identifier of the terminal device, an identifier of the application, the access identifier of the source data network, and the access identifier of the target data network.

Optionally, the transceiver unit 820 is further configured to send a fifth message to the core network control plane network element, where the fifth message is used to subscribe to a user plane path change event of the terminal device.

Optionally, the apparatus is an MEC orchestrator or an MEC platform manager.

Optionally, the apparatus includes an MEC orchestrator and an MEC platform manager, and the MEC orchestrator includes: a first transceiver unit, configured to send the first message to the first MEC platform through the MEC platform manager, and receive the second message from the first MEC platform through the MEC platform manager.

Optionally, the first transceiver unit is further configured to: send a sixth message to the MEC platform manager, where the sixth message is used to subscribe to the migration state of the user context of the application; the MEC platform manager includes: a second transceiver unit, configured to receive the sixth message, and send a first acknowledgment message to the MEC orchestrator; and the first transceiver unit is further configured to receive the first acknowledgment message.

Optionally, the MEC platform manager includes: the second transceiver unit, configured to: send a seventh message to the first MEC platform, where the seventh message is used to subscribe to the migration state of the user context of the application; and receive a second acknowledgment message from the first MEC platform.

Optionally, the MEC platform manager includes: the second transceiver unit, configured to receive the second message from the first MEC platform, send a third acknowledgment message to the MEC platform, and send the second message to the MEC orchestrator; the MEC orchestrator includes: the first transceiver unit, configured to receive the second message, and send a fourth acknowledgment message to the MEC platform manager; and the second transceiver unit is further configured to receive the fourth acknowledgment message.

It should be understood that the transceiver unit, the first transceiver unit, and the second transceiver unit may be three independent units or may be an integrated unit. For example, the first transceiver unit is configured to perform receiving and sending actions corresponding to the transceiver unit. In this case, the transceiver unit and the first transceiver unit are integrated into one unit. Alternatively, the second transceiver unit is configured to perform receiving and sending actions corresponding to the transceiver unit. In this case, the transceiver unit and the second transceiver unit are integrated into one unit. This is not limited in this embodiment.

In another possible implementation, the apparatus 800 may be the foregoing first MEC platform or may be a chip in the first MEC platform and is configured to perform the procedures or steps corresponding to the first MEC platform in the method 400.

The transceiver unit 820 is configured to receive a third message from a core network control plane network element, where the third message is used to notify that a user plane path of a terminal device has changed. The processing unit 810 is configured to: obtain, based on the third message, information about a source application instance of an application accessed by the terminal device and information about a target application instance of the application; and migrate a user context of the application from the source application instance to the target application instance, where the source application instance is deployed on the apparatus, and the target application instance is deployed on a second MEC platform.

Optionally, the processing unit 810 may be configured to: send a request message to an MEC orchestrator based on the third message, where the request message is used to request the information about the target application instance; and receive the information that is about the target application instance and that is sent by the MEC orchestrator.

Optionally, the transceiver unit 820 is further configured to send a fourth message to the core network control plane network element, where the fourth message is a positive acknowledgment or a negative acknowledgment for the third message.

Optionally, the third message includes at least one of the following information: an identifier of the terminal device, an identifier of the application, an access identifier of a source data network, and an access identifier of a target data network.

Optionally, the transceiver unit 820 is further configured to send a fifth message to the core network control plane network element, where the fifth message is used to subscribe to a user plane path change event of the terminal device.

It should be understood that the apparatus 800 herein is presented in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 800 may be the MEC network element or the first MEC platform in the foregoing method embodiments, and the apparatus 800 may be configured to perform the procedures and/or steps corresponding to the MEC network element or the first MEC platform in the foregoing method embodiments. To avoid repetition, details are not described herein again.

The apparatus 800 in the foregoing solutions has a function for implementing a corresponding step performed by the MEC network element or the first MEC platform in the foregoing methods. The function may be implemented by hardware or may be implemented by hardware executing corresponding software. The hardware or the software includes one or more modules corresponding to the foregoing function. For example, the transceiver unit may include a receiving unit and a sending unit. The sending unit may be replaced with a transmitter, the receiving unit may be replaced with a receiver, and another unit, for example, the processing unit, may be replaced with a processor, to separately perform receiving and sending operations and related processing operations in the method embodiments.

In this embodiment, the apparatus in FIG. 8 may alternatively be a chip or a chip system, for example, a system on chip (SoC). Correspondingly, the transceiver unit (the receiving unit and the sending unit) may be a transceiver circuit of the chip. This is not limited herein.

Figure 9:
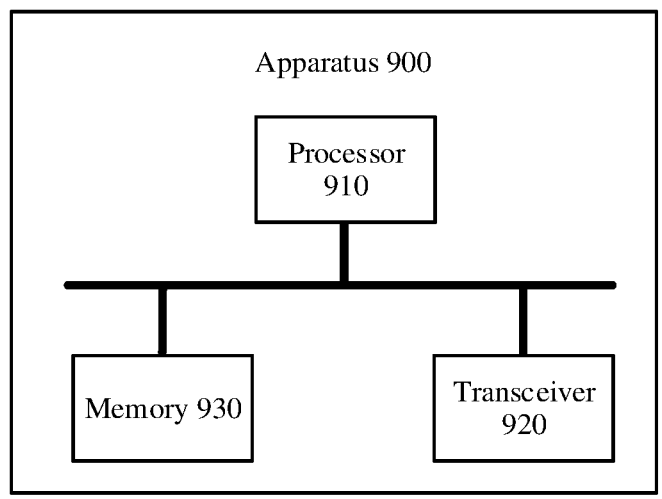
FIG. 9 is a schematic block diagram of another communication apparatus according to an embodiment.

FIG. 9 shows another communication apparatus 900 according to an embodiment. The apparatus 900 includes a processor 910, a transceiver 920, and a memory 930. The processor 910, the transceiver 920, and the memory 930 communicate with each other by using an internal connection path. The memory 930 is configured to store an instruction. The processor 910 is configured to execute the instruction stored in the memory 930, to control the transceiver 920 to send a signal and/or to receive a signal.

In a possible implementation, the apparatus 900 is configured to perform the procedures or steps corresponding to the MEC network element in the method 300.

The processor 910 is configured to obtain information about a source application instance of an application accessed by a terminal device and information about a target application instance of the application. The transceiver 920 is configured to send a first message to a first MEC platform, where the first message is used to request to migrate a user context of the application from the source application instance to the target application instance, the source application instance is deployed on the first MEC platform, and the target application instance is deployed on a second MEC platform. The transceiver 920 is further configured to receive a second message from the first MEC platform, where the second message indicates a migration state of the user context of the application.

In another possible implementation, the apparatus 900 is configured to perform the procedures or steps corresponding to the first MEC platform in the method 400.

The transceiver 920 is configured to receive a third message from a core network control plane network element, where the third message is used to notify that a user plane path of a terminal device has changed. The processor 910 is configured to: obtain, based on the third message, information about a source application instance of an application accessed by the terminal device and information about a target application instance of the application; and migrate a user context of the application from the source application instance to the target application instance, where the source application instance is deployed on the apparatus, and the target application instance is deployed on a second MEC platform.

It should be understood that the apparatus 900 may be the MEC network element or the first MEC platform in the foregoing method embodiments and may be configured to perform the steps and/or procedures corresponding to the MEC network element or the first MEC platform in the foregoing method embodiments. Optionally, the memory 930 may include a read-only memory and a random access memory and provide instructions and data for the processor. A part of the memory may further include a non-volatile random access memory. For example, the memory may further store information about a device type. The processor 910 may be configured to execute the instructions stored in the memory. When the processor 910 executes the instructions stored in the memory, the processor 910 is configured to perform the steps and/or procedures corresponding to the MEC network element or the first MEC platform in the foregoing method embodiments.

It should be understood that the foregoing transceiver may include a transmitter and a receiver. The transceiver may further include an antenna. There may be one or more antennas. The memory may be an independent component or may be integrated into the processor. All or some of the foregoing components may be integrated into a chip for implementation, for example, integrated into a baseband chip for implementation.

In this embodiment, the transceiver in FIG. 9 may alternatively be a communication interface. This is not limited herein.

In this embodiment, the MEC network element or the first MEC platform may be a physical entity device or a virtual functional network element. This is not limited herein.

In the embodiments, for ease of understanding, a plurality of examples may be used for description. However, these examples are merely examples, but this does not mean that these examples are optimal implementations for implementing this application.

In the embodiments, for ease of description, a first message, a second message, and names of various other messages may be used. However, these messages are merely used as examples to describe content that needs to be carried or an implemented function. Names of the messages constitute no limitation. For example, the messages may alternatively be a notification message and a response message. These messages may be some fields in the messages. These messages may alternatively represent various service operations.

It should be further understood that, the processor in the foregoing apparatus in embodiments may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The steps of the methods with reference to the embodiments may be directly performed and completed by a hardware decoding processor or may be performed and completed by using a combination of hardware in the decoding processor and a software module. The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps of the methods in combination with the hardware of the processor.

It may be understood that the memory in the embodiments may be a volatile memory, a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in the embodiments includes, but is not limited to, these memories and any memory of another appropriate type.

According to the methods, the embodiments may further provide a computer program product. The computer program product includes computer program code. When the computer program code is run on a computer, the computer is enabled to perform the method corresponding to any network element in any one of the foregoing embodiments. For example, the computer may perform the method corresponding to the MEC network element in the method 300, or the method corresponding to the first MEC platform in the method 400.

According to the methods, the embodiments may further provide a non-transitory computer-readable medium. The non-transitory computer-readable medium stores program code. When the program code is run on a computer, the computer is enabled to perform the method corresponding to any network element in any one of the embodiments shown in FIG. 3 to FIG. 7. For example, the computer may perform the method corresponding to the MEC network element in the method 300, or the method corresponding to the first MEC platform in the method 400.

According to the methods, the embodiments may further provide a system. The system includes one or more network elements in the foregoing method embodiments. For example, the system may include the MEC network element in the method 300. For another example, the system may include the first MEC platform in the method 400.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments are completely or partially generated. The computer may be a general-purpose computer, a dedicated computer, a computer network, or another programmable apparatus. The computer instructions may be stored in a computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

Terms such as "component", "module", and "system" indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and according to, for example, a signal having one or more data packets (for example, data from two components interacting with another component in a local system, a distributed system, and/or across a network such as the internet interacting with other systems by using the signal).

"At least one" means one or more, and "a plurality of" means two or more. The term "and/or" describes an association relationship between associated objects and indicates that three relationships may exist. For example, A and/or B may indicate the following cases: only A exists, both A and B exist, and only B exists, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

A person of ordinary skill in the art may be aware that, in combination with various illustrative logical blocks and steps, described in the embodiments, can be implemented by electronic hardware or a combination of computer software and electronic hardware. Whether the functions are performed by hardware or software depends on particular applications. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing described system, apparatus, and unit, refer to a corresponding process in the foregoing method embodiments, and details are not described herein again.

In the several embodiments, it should be understood that the system, apparatus, and method may be implemented in other manners. For example, the apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on actual requirements to achieve the objectives of the embodiments.

In addition, functional units in the embodiments may be integrated into one processing unit, each of the units may exist alone physically, or two or more units may be integrated into one unit.

When the functions are implemented in a form of a software functional unit and sold or used as an independent product, the functions may be stored in a non-transitory computer-readable storage medium. Based on such an understanding, the embodiments, or the part contributing to the current technology, or some of the embodiments may be implemented in a form of a software product. The computer software product is stored in a storage medium and includes several instructions for instructing a computer device (which may be a personal computer, a server, a network device, or the like) to perform all or some of the steps of the method described in the embodiments. The storage medium includes any medium that can store program code, for example, a USB flash drive, a removable hard disk, a read-only memory (ROM), a random access memory (RAM), a magnetic disk, or an optical disc.

The foregoing descriptions are merely implementations of the embodiments, but are not intended to limit the scope of the embodiments. Any variation or replacement readily figured out by a person skilled in the art shall fall within the scope of the embodiments.

What is claimed is:

1. A communication method, comprising:
obtaining, by a multi-access edge computing (MEC) network element, information about a source application instance of an application accessed by a terminal device and information about a target application instance of the application;
sending, by the MEC network element, a first message to a first MEC platform, wherein the first message is used to request to migrate a user context of the application from the source application instance to the target application instance, the source application instance is deployed on the first MEC platform, and the target application instance is deployed on a second MEC platform;
receiving, by the MEC network element, a second message from the first MEC platform, wherein the second message indicates a migration state of the user context of the application;
receiving, by the MEC network element, a third message from a core network control plane network element, wherein the third message is used to notify that a user plane path of the terminal device has changed; and
determining, by the MEC network element, the information about the source application instance and the information about the target application instance based on the third message, wherein the source application instance is located at a location corresponding to an access identifier of a source data network, and the target application instance is located at a location corresponding to an access identifier of a target data network.

2. The communication method according to claim 1, further comprising:
sending, by the MEC network element, a fourth message to the core network control plane network element based on the second message, wherein the fourth message is a positive acknowledgment or a negative acknowledgment for the third message.

3. The communication method according to claim 1, wherein the third message comprises at least one of the following information:
an identifier of the terminal device, an identifier of the application, the access identifier of the source data network, and the access identifier of the target data network.

4. The communication method according to claim 1, wherein before receiving, by the MEC network element, the third message from the core network control plane network element, the method further comprises:
sending, by the MEC network element, a fifth message to the core network control plane network element, wherein the fifth message is used to subscribe to a user plane path change event of the terminal device.

5. The communication method according to claim 1, wherein the MEC network element is an MEC orchestrator or an MEC platform manager.

6. The communication method according to claim 1, wherein the MEC network element comprises an MEC orchestrator and an MEC platform manager, and sending, by the MEC network element, the first message to a first MEC platform further comprises:
sending, by the MEC orchestrator, the first message to the first MEC platform through the MEC platform manager; and
receiving, by the MEC network element, the second message from the first MEC platform further comprises:

receiving, by the MEC orchestrator, the second message from the first MEC platform through the MEC platform manager.

7. The communication method according to claim 6, further comprising:
sending, by the MEC orchestrator, a sixth message to the MEC platform manager, wherein the sixth message is used to subscribe to the migration state of the user context of the application;
receiving, by the MEC platform manager, the sixth message, and sending a first acknowledgment message to the MEC orchestrator; and
receiving, by the MEC orchestrator, the first acknowledgment message.

8. The communication method according to claim 6, further comprising:
sending, by the MEC platform manager, a seventh message to the first MEC platform, wherein the seventh message is used to subscribe to the migration state of the user context of the application; and
receiving, by the MEC platform manager, a second acknowledgment message from the first MEC platform.

9. The communication method according to claim 6, wherein receiving, by the MEC orchestrator, the second message from the first MEC platform through the MEC platform manager further comprises:
receiving, by the MEC platform manager, the second message from the first MEC platform;
sending, by the MEC platform manager, a third acknowledgment message to the MEC platform;
sending, by the MEC platform manager, the second message to the MEC orchestrator;
receiving, by the MEC orchestrator, the second message, and sending a fourth acknowledgment message to the MEC platform manager; and
receiving, by the MEC platform manager, the fourth acknowledgment message.

10. A communication method, comprising:
receiving, by a first multi-access edge computing (MEC) platform, a third message from a core network control plane network element, wherein the third message is used to notify that a user plane path of a terminal device has changed;
obtaining, by the first MEC platform based on the third message, information about a source application instance of an application accessed by the terminal device and information about a target application instance of the application; and
migrating, by the first MEC platform, a user context of the application from the source application instance to the target application instance, wherein the source application instance is deployed on the first MEC platform, and the target application instance is deployed on a second MEC platform.

11. The communication method according to claim 10, wherein obtaining, by the first MEC platform based on the third message, the information about the source application instance of the application accessed by the terminal device and the information about the target application instance of the application further comprises:
sending, by the first MEC platform, a request message to an MEC orchestrator based on the third message, wherein the request message is used to request the information about the target application instance; and
receiving, by the first MEC platform, the information that is about the target application instance and that is sent by the MEC orchestrator.

12. The communication method according to claim 10, further comprising:

sending, by the first MEC platform, a fourth message to the core network control plane network element, wherein the fourth message is a positive acknowledgment or a negative acknowledgment for the third message.

13. The communication method according to claim 10, wherein the third message comprises at least one of the following information:

an identifier of the terminal device, an identifier of the application, an access identifier of a source data network, and an access identifier of a target data network.

14. The communication method according to claim 10, wherein before receiving, by the first multi-access edge computing MEC platform, the third message from the core network control plane network element, the method further comprises:

sending, by the first MEC platform, a fifth message to the core network control plane network element, wherein the fifth message is used to subscribe to a user plane path change event of the terminal device.

15. A communication apparatus, comprising a processor, a memory, and instructions that are stored in the memory and that can be run on the processor, wherein the instructions, when running, cause the apparatus to perform a method comprising:

obtaining information about a source application instance of an application accessed by a terminal device and information about a target application instance of the application; and sending a first message to a first multi-access edge computing (MEC) platform, wherein the first message is used to request to migrate a user context of the application from the source application instance to the target application instance, the source application instance is deployed on the first MEC platform, and the target application instance is deployed on a second MEC platform;

receiving a second message from the first MEC platform, wherein the second message indicates a migration state of the user context of the application;

receiving, by the MEC network element, a third message from a core network control plane network element, wherein the third message is used to notify that a user plane path of the terminal device has changed; and determining, by the MEC network element, the information about the source application instance and the information about the target application instance based on the third message, wherein the source application instance is located at a location corresponding to an access identifier of a source data network, and the target application instance is located at a location corresponding to an access identifier of a target data network.

16. A communication apparatus, comprising a processor, a memory, and instructions that are stored in the memory and that can be run on the processor, wherein the instructions, when running, cause the apparatus to perform a method comprising:

receiving a third message from a core network control plane network element, wherein the third message is used to notify that a user plane path of a terminal device has changed; and obtaining, based on the third message, information about a source application instance of an application accessed by the terminal device and information about a target application instance of the application; and migrating a user context of the application from the source application instance to the target application instance, wherein the source application instance is deployed on the communication apparatus, and the target application instance is deployed on a second multi-access edge computing (MEC) platform.

* * * * *